June 19, 1951 P. J. BILY 2,557,495
SANITARY SWIVEL JOINT
Filed Feb. 9, 1948
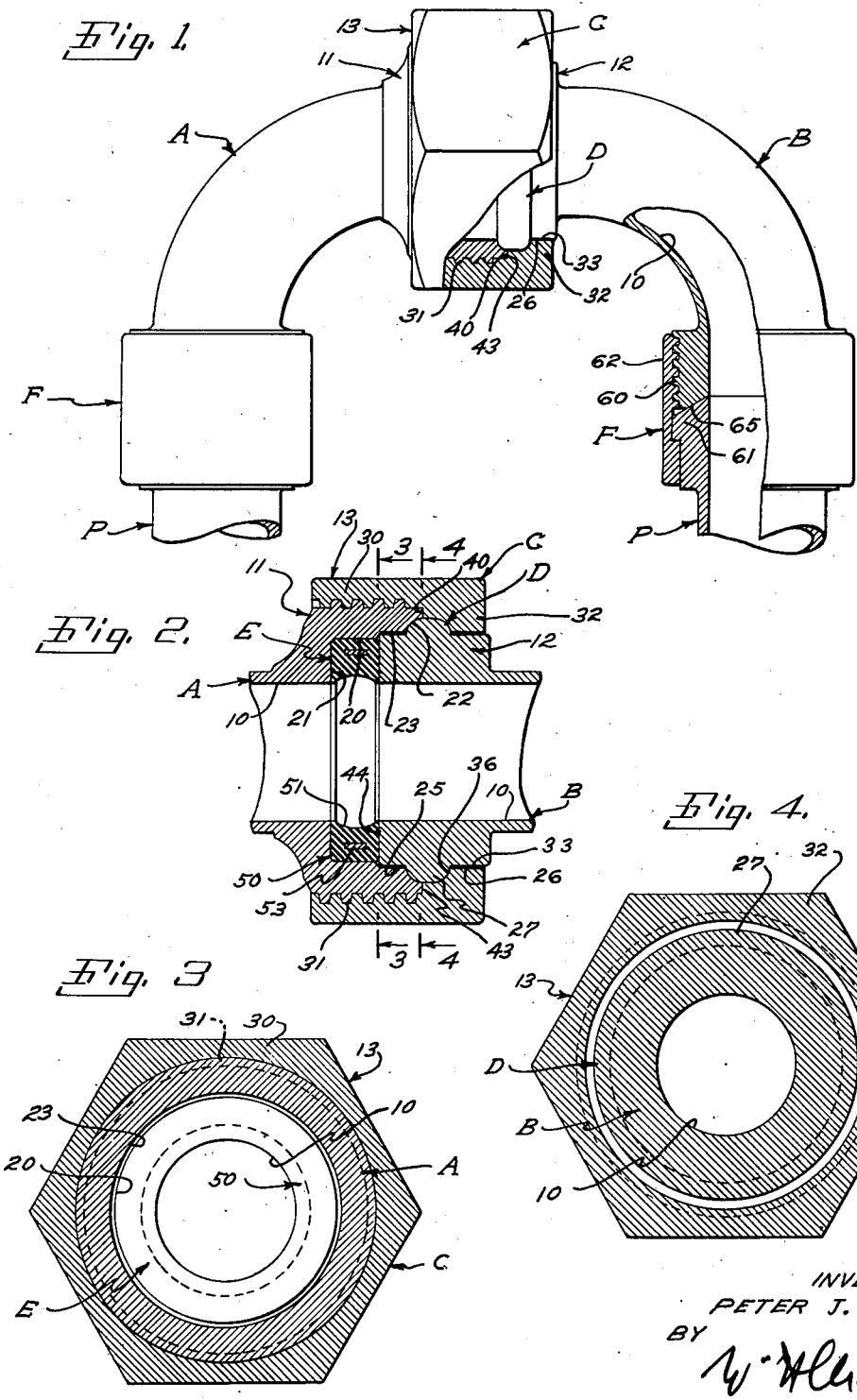
INVENTOR
PETER J. BILY
BY
W. H. Chadwell
ATTORNEY Patented June 19, 1951

2,557,495

UNITED STATES PATENT OFFICE 2,557,495

SANITARY SWIVEL JOINT

Peter J. Bily, Brea, Calif., assignor to Chiksan Company, Brea, Calif., a corporation of California Application February 9, 1948, Serial No. 7,197

11 Claims. (Cl. 285—97.5)

This invention relates to a sanitary swivel joint and it is a general object of the invention to provide a simple, practical joint connecting elements for swinging or pivotal movement, and such that it may be easily maintained in a sanitary condition.

There are various situations where fluids, such for example as foods, must be handled in sanitary equipment in order to avoid contamination or deterioration. Where ducts or piping systems are used there are points where swinging or pivotal connections are desired. However, swing joints such as are in general commercial use are not ordinarily sanitary as they are characterized by structures that catch and hold materials or foreign matter both inside and out, and they are not such as to be quickly taken apart and thoroughly cleaned.

It is a general object of my present invention to provide a fitting or joint construction that connects two parts for relative pivotal movement and which involves a minimum number of parts, all of which are exceedingly simple of design and are free of structural features tending to catch or accumulate either the material being handled or foreign matter that may contact the structure.

Another object of the present invention is to provide a structure of the general character referred to which is such that it is easily and quickly separable into its component parts so that it can be easily and thoroughly cleaned.

It is a further object of my present invention to provide a structure of the general character referred to involving bearing engagement between the relatively moving parts whereby a long wearing, freely operable construction is provided without the use of small or numerous parts such as characterizes usual anti-friction constructions.

It is another object of the present invention to provide a structure of the general character referred to that affords a full diameter fluid handling passage wholly free of restrictions or obstructions and which is smooth-surfaced and such that it can be easily and quickly cleaned.

A further object of the invention is to provide a structure of the character referred to which includes a single simple packing ring supported in one of the connected elements to have sealing engagement with the inner end face of the other element, which ring may be readily removed for cleaning and is such that it cannot possibly become displaced in a manner to enter the material being handled.

The various objects and features of my invention will be fully understood from the following detailed description of a typical preferred form and application of the invention, throughout which description reference is made to the accompanying drawings, in which:

Fig. 1 is a side elevation of a typical joint construction embodying the present invention with certain parts broken away to show in section. Fig. 2 is an enlarged central sectional view of the swivel joint construction. Fig. 3 is a transverse sectional view taken as indicated by line 3—3 on Fig. 2, and Fig. 4 is a transverse sectional view taken as indicated by line 4—4 on Fig. 2.

The structure shown in the drawings and embodying the present invention involves, generally, two relatively movable elements A and B, means C releasably coupling the inner or adjoining ends of the elements A and B, bearing means D incorporated in the coupling means C, sealing means E providing a seal between the elements A and B, and releasable pipe connections F at the outer ends of the elements A and B.

The elements A and B may be flow-conducting members and, as I have shown in the drawings, they are substantially alike, both being shown in the form of L's. It is to be understood, of course, that the members A and B may be of any suitable character and may be shaped and proportioned as circumstances require. The particular elements A and B shown in the drawings are substantially alike in size and shape and each is arcuate in form, extending through an arc of about 90°. Each member is round in cross section and it is preferred that it be uniform in size throughout its length, and that it be provided with a smooth inner wall or surface 10, so that the flow passage extending through it may be easily wiped clean.

The releasable coupling means C is confined to the inner or adjoining ends of the conducting members A and B and its acts through the bearing means D to releasably join the members A and B for relative rotation or for sufficient movement. In accordance with my construction the means C involves, generally, enlarged parts or projections 11 and 12 on the inner ends of the members A and B, respectively, and a threaded collar 13 acting as the connecting member. In the preferred form of the invention the enlarged part 11 on section A is a female part having a socket opening entering it from its outer end while the part 12 is a male part that enters the socket opening of part 11. The enlarged parts 12 and 13 are preferably fixed or integrally joined to the inner ends of the sections A and B, respectively, either as integral parts thereof, or they are bonded to the members A and B as by welding, or the like.

The socket in the female part 11 is formed with an inner portion 20 terminating at or in a bottom 21, an outer portion 22 that receives the bearing means D, and an intermediate portion 23 that freely receives the projecting or outer end of the part 12.

The male part 12 has a projecting end portion 25 freely received in the intermediate portion 23 of the socket. The other end portion 26 of the part 12 is turned and is freely received in the collar 13. The intermediate portion of part 12 that occurs between the end portions 25 and 26 carries the part 27 of the bearing means D.

The sleeve 13 has what I will term an inner end portion 30 that surrounds and is threaded to the female part 11, the exterior of the female part being provided with threads 31 with which the sleeve 13 cooperates. In accordance with the invention the threads connecting the part 11 and sleeve 13 are coarse or heavy threads, say for instance, Acme type threads, thus providing a secure, sturdy connection between these parts which is coarse enough so that the parts thereof can be readily cleaned. The sleeve has an inwardly projecting outer end portion 32 that surrounds the male part 12 with clearance and which has an opening 33 slidably receiving the end portion 26 of part 12.

The bearing means D involves primarily the member 27 provided on the part 12 intermediate the end portions 25 and 26 thereof. In accordance with the preferred form of the invention the bearing part 27 is in the nature of an annular rib or projection preferably integral with the part 12 and finished so that its outer corners or end portions are rounded. The outer end portion 22 of the socket opening is enlarged somewhat and is shaped or rounded to form a seat for one end of the rib 27 while the end portion 32 of the sleeve 13 is provided with a curved or rounded seat 36 receiving the other end of the rib 27. When the sleeve 13 is in place on the part 11 the inner end 40 of the sleeve part 32 seats against the outer end 43 of the part 11. When the sleeve is thus engaged on part 11 the sleeve and part 11 cooperate to define an annular space or chamber receiving the rib 27 so that the rib is slidable therein. In practice the outer surface of bearing rib 27 is hardened as by means of hard chrome plating, or other suitable means, and the surfaces of the end parts 25, 26 and of the rib 27 are finished to be smooth. When plating is employed the surfaces at 25 and 26 will also be plated and hard. The other elements of the construction, that is, the part 11 and sleeve 13, are finished so that their surfaces are smooth, but it is preferred that they be unhardened or, in other words, that they be left so that there is a differential in hardness between these parts and the ones first mentioned, as it has been found that such relationship assures long wear and smooth performance and prevents seizing of the parts.

The sealing means E is preferably a simple annular part of conformable material, such as rubber or a rubber-like composition, and it is confined in the space that occurs between the bottom 21 of the socket in part 11 and the end part 44 of part 12. The packing ring is carried in or confined to the inner end portion 20 of the socket, in which opening it seats so that it can be readily removed when the structure is apart. In accordance with the preferred construction the ring 50 of rubber is formed with a slightly concave inner side 51. A reinforcing ring 53 of metal is embedded or incorporated in the body of rubber positively holding the ring 50 in shape and preventing collapse of the ring in a manner that might allow it to enter the material being conducted by the structure.

The releasable pipe connections at the outer ends of the elements A and B are preferably alike and in the case illustrated each involves an enlargement or head 60 on the end of the member of the joint construction, a flange-like part 61 on the end of the pipe P, and a collar 62 coupling the parts 60 and 61.

The head 60 may be in the form of an integral enlargement on the end of its supporting part. In the case of the head 60 on the outer end of member B it is important that this head be smaller in diameter than the smallest opening through the collar 13 of means C, that is, that it be smaller in diameter than the opening 33 of the collar 13. With this construction it is possible when the collar 13 is separated from the part 11 to slide it over member B and over the head 60 on member B, thus completely separating the parts for cleaning.

The head 60 is shown provided at its outer or exposed end with a seat 65. The flange 61 engages and seals with the seat 65 and the sleeve 62 which is threaded on the exterior of the head 60 engages the flange 61 and holds it seated against the head.

From the foregoing description it will be apparent that I have through my construction provided a joint between the members A and B, allowing them to turn freely relative to each other while they are sealed, so that fluid can be passed through them without leakage. The connections at the outer ends of the members A and B enable the entire construction to be separated from pipes which they connect and through the construction that I have provided the means C can be easily and quickly released or disengaged whenever desired, allowing the members A and B to be separated. To facilitate operation of the collar 13 it is preferred that its exterior be made polygonal in configuration so that it can be readily engaged by an ordinary wrench, or the like. When the collar 13 has been disengaged from part 11 the members A and B can be separated and when the members A and B are separated the packing ring can be easily removed from the socket in member 11. Further, it is to be observed that the construction that I have provided is such as to readily lend itself to being formed of stainless steel or the like, which will effectively resist the corrosive action of most materials, particularly foods. By constructing the various parts of stainless steel and by forming the packing ring of a suitable rubber or rubber-like composition, I provide a structure that can be kept in a sanitary condition with a minimum of effort.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. A coupling including in combination, two L-shaped flow conductors, a socket part fixed on the end of one conductor and having a socket entering from its outer end with an inner portion terminating in a flat shoulder transverse of the longitudinal axis of the coupling, a concave outer portion and a straight cylindrical intermediate portion, a male part fixed on one end of the other conductor with an inner end rotatably engaged in the socket, a fixed convex bearing projection on the exterior of the male part rotatably engaging the concave portion of the socket, a sleeve threaded over the socket and having an internal concave seat rotatably engaging the projection, a sealing ring in the inner portion of the socket sealing with the shoulder and the inner end of the male part, and pipe connecting means on the other end of said other conductor including an externally threaded enlargement fixed on the said other member smaller in diameter than the opening through the sleeve, a pipe part sealed against said threaded enlargement, and a coupler threaded on said threaded enlargement and holding the pipe part against the end of said threaded enlargement.

2. A coupling between two flow conductors including, a socket part fixed on the end of one conductor and having a socket entering from its outer end, the socket having an inner portion terminating in a shoulder transverse of the longitudinal axis of the coupling, a concave outer portion and a straight cylindrical intermediate portion, a male part fixed on one end of the other conductor and rotatably engaged in the socket, a fixed convex bearing projection on the male part rotatably engaged in the concave portion of the socket, a sleeve threaded over the socket and having an internal concave seat rotatably engaging the projection, a sealing ring in the inner portion of the socket sealing with the shoulder and the inner end of the male part, and pipe connecting means on the other end of said other conductor including an externally threaded enlargement fixed on the said other member and smaller in diameter than the opening through the sleeve, a pipe part sealed against the threaded enlargement, and a coupler threaded on the threaded enlargement and holding the pipe part against the end of the threaded enlargement, said other member having a curved flow conducting part extending between the inner end of said other part and the said externally threaded enlargement.

3. A coupling between two tubular flow conductors including, a socket part fixed on the end of one conductor and having a socket opening extending into it from its outer end, the socket part having a flat shoulder at the inner end of the opening and disposed in a plane normal to the longitudinal axis of the coupling, the socket opening having a concave outer portion and having a straight cylindrical intermediate portion, a male part fixed on the end of the other conductor and having an inner end rotatable in the intermediate portion of the socket, the male part having a bearing projection fixed on the exterior thereof, the projection having convex portions one of which is rotatable in the concave portion of the socket and having bearing engagement therewith, a sleeve threaded to the socket and having an internal concave seat rotatably engaging another convex portion of the projection, and a sealing ring in the inner portion of the socket having sealing engagement with the shoulder and with the inner end of the male part.

4. A coupling between two tubular flow conductors including, a socket part fixed on the end of one conductor and having a socket opening extending into it from its outer end, the socket having a flat shoulder at the inner end of the opening and disposed in a plane normal to the longitudinal axis of the coupling, the socket opening having a concave outer portion and a straight cylindrical intermediate portion between the shoulder and the concave portion, a male part fixed on the end of the other conductor and rotatable in the socket opening, an integral projection on the exterior of the male part spaced from its terminal end and having convex ends one of which is rotatably engaged in the concave portion of the socket opening, a sleeve threaded to the exterior of the socket part and having an inwardly projecting end portion with an internal concave seat rotatably engaging the other convex end of the projection, and a sealing ring in the inner portion of the socket opening sealing with the shoulder and with the inner end of the male part.

5. A coupling between two tubular flow conductors including, a socket part fixed on the end of one conductor and having a socket opening extending into it from its outer end, the socket part having an axially facing shoulder at the inner end of the opening, the opening having a concave outer end portion and a straight cylindrical intermediate portion, a male part fixed on the end of the other conductor and rotatable in the socket opening, a rigid bearing projection on the exterior of the male part rotatably bearing in the concave portion of the socket opening, a sleeve threaded onto the exterior of the socket part and having an internal concave seat rotatably engaging the projection, the socket part and male part cooperating to define an inwardly opening channel at the inner portion of the socket opening, and a sealing ring in the channel sealing with the shoulder and with the inner end of the male part, the sealing ring including an annular body of rubber and a continuous metal reinforcing ring wholly embedded in the body of rubber.

6. A coupling between two tubular flow conductors including, a socket part fixed on the end of one conductor and having a socket opening extending into it from its outer end there being a shoulder in the socket part at the inner end of the opening and disposed normal to the longitudinal axis of the coupling, the opening having a concave outer end portion and a straight cylindrical intermediate portion, a male part fixed on the end of the other conductor and rotatable in the socket opening and having an inner end opposing the shoulder, a fixed convex bearing projection on the exterior of the male part rotatably engaged in the concave portion of the socket opening, a sleeve having one end threaded onto the socket part and having its other end rotatable on the outer end portion of the male part and having an inwardly projecting end portion with an internal concave seat intermediate the ends of the sleeve rotatably engaging the projection, and a sealing ring in the inner portion of the socket opening sealing with the shoulder and with the inner end of the male part, the inwardly projecting end portion of the sleeve having an internal axially facing shoulder seating against the outer end of the socket part.

7. A coupling between two tubular flow conductors including, a socket part fixed on the end of one conductor and having a socket opening extending into it from its outer end, the socket part having a shoulder at the inner end of the opening and disposed transversely of the longitudinal axis of the coupling, the opening having a concave outer portion and a straight cylindrical intermediate portion, a male part fixed on one end of the other conductor and rotatable in the socket opening, a fixed convex bearing projection on the exterior of the male part rotatably engaged in the concave portion of the socket opening, a sleeve threaded onto the socket part and having an inwardly projecting end portion with an internal concave seat rotatably engaging the projection, a sealing ring in the inner portion of the socket opening sealing with the shoulder and with the inner end of the male part, and pipe connecting means on the other end of said other conductor including an externally threaded projection fixed on the said other conductor and having an external diameter smaller than the opening through the sleeve, a pipe part sealed against the threaded part, and a removable coupler threaded on the said externally threaded part and engaging the pipe part and holding it against the end of the said externally threaded part.

8. A coupling for connecting two flow lines including, a tubular flow conductor having fixed externally threaded enlargements on its ends for making connection with adjoining flow conductors, the outside diameter of one of said enlargements being smaller than that of the other enlargement, an annular coupler engageable over the smaller of said enlargements and cooperating with the larger of said enlargements to connect the larger of said enlargements with one flow line, and an annular coupler cooperating with the smaller of said enlargements to connect the smaller of said enlargements with the other flow line.

9. A male element for a joint of the character described including, a cylindrical part engageable in a socket, the element having a flat inner end at which said part terminates and which is in a plane normal to the longitudinal axis of the said part, and a fixed projection on the exterior of said part intermediate the ends thereof and projecting radially outward therefrom and having like convex ends.

10. A coupling member for a joint of the character described including, an internally threaded sleeve portion, and an inwardly projecting flange at the outer end of the sleeve portion with a central opening through it substantially smaller in diameter than the opening of the sleeve portion, there being a shoulder in said member where the sleeve portion and flange join, the shoulder being disposed in a plane normal to the longitudinal axis of the sleeve, the corner between the shoulder and the said central opening being concave.

11. A unitary element forming a socket for a joint of the character described and including, an externally threaded tubular part with a socket opening extending into it from its outer end, there being a transverse shoulder at the inner end of the opening, the opening having a concave outer end portion adjoining said outer end and having a cylindrical portion between the concave outer end portion and the shoulder.

PETER J. BILY.

REFERENCES CITED

The following references are of record in the file of this patent:

UNITED STATES PATENTS

| Number | Name | Date |
|---|---|---|
| 676,846 | Moran | June 18, 1901 |
| 680,649 | Crombie | Aug. 31, 1901 |
| 782,552 | Glauber | Feb. 14, 1905 |
| 808,457 | Kraver | Dec. 26, 1905 |
| 904,673 | Bideker | Nov. 24, 1908 |
| 993,774 | Greenlaw | May 30, 1911 |
| 1,297,370 | Loomis | Mar. 18, 1919 |
| 2,210,833 | Clough | Aug. 6, 1940 |
| 2,238,535 | Meyer | Apr. 15, 1941 |
| 2,486,451 | Warren | Nov. 1, 1949 |

FOREIGN PATENTS

| Number | Country | Date |
|---|---|---|
| 30,287 | France | Mar. 31, 1926 |
| | (1st addition to No. 552,698) | |
| 849,141 | France | Nov. 14, 1939 |